US006332435B1

(12) United States Patent
Kaita

(10) Patent No.: US 6,332,435 B1
(45) Date of Patent: Dec. 25, 2001

(54) CRANK JOURNAL SUPPORT PORTION STRUCTURE OF A HORIZONTAL OPPOSED TYPE ENGINE

(75) Inventor: Keiji Kaita, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/652,786

(22) Filed: Aug. 31, 2000

(51) Int. Cl.[7] .................... F16H 21/18

(52) U.S. Cl. .................... 123/55.2; 123/55.5; 123/55.7; 123/195 R

(58) Field of Search .................... 123/55.2, 55.5, 123/55.7, 195 R

(56) References Cited

U.S. PATENT DOCUMENTS 5,259,256 * 11/1993 Brackett .................... 123/55.5
5,456,159 * 10/1995 Brackett .................... 123/55.7
5,799,628 * 9/1998 Lacerda .................... 123/55.7
6,142,129 * 11/2000 Hori et al. .................... 123/55.2
6,223,704 * 5/2001 Chatelain .................... 123/55.2

FOREIGN PATENT DOCUMENTS 58-24613 2/1983 (JP) .
5-157005 6/1993 (JP) .
9-133124 5/1997 (JP) .

* cited by examiner

*Primary Examiner*—Marguerite McMahon
(74) *Attorney, Agent, or Firm*—Oliff & Berridge PLC

(57) ABSTRACT

The invention minimizes the problem of deterioration in engine strength by concentration of stress due to the combustion load in a hole portion provided on a crank journal support wall in a crank case and reduces pumping loss. Further, the invention discharges blow-by gas smoothly, while reducing the engine weight. There is provided a crank journal support portion structure disposed in a crank case of a horizontal opposed type engine, wherein a hole portion communicating with an adjacent cylinder is opened at rotation angular positions of a crank journal yielding small stress generated at a crank journal support wall portion by transmitting combustion load to the crank journal via a piston connecting rod, in the vicinity of the crank journal support hole of the crank journal support wall portion disposed between respective cylinders.

2 Claims, 5 Drawing Sheets

CRANK JOURNAL SUPPORT PORTION STRUCTURE OF A HORIZONTAL OPPOSED TYPE ENGINE

BACKGROUND OF THE INVENTION

1. Field of Invention

The present invention relates to a crank journal support portion structure of a horizontal opposed type engine and, especially, a crank journal support portion structure of a horizontal opposed type engine wherein an opening portion is provided in an area of crank journal support wall portions disposed between cylinders where the influence of stress concentration due to combustion load is small.

2. Description of Related Art

Generally, as for reciprocating engines whose cylinder disposition is of type other than a horizontally opposed type, such as straight-type or v-type engines, as shown in FIG. 4 and FIG. 5, a crank journal support wall portion 45 of a crank shaft 42 is disposed between respective cylinders 43, in a crank case 41 defined at the bottom of an engine cylinder block 40. Such engines are configured such that the crank shaft 42 is fit inside the crank case 41, by arranging a crank journal 44 via a bearing on a semi-circular journal bearing portion 46 formed at this crank journal support wall portion 45, and fixing with a bearing cap 47 from the engine bottom side.

In this case, a hole portion is often provided in respective crank journal support wall portion 45 penetrating in a thickness direction thereof such that respective cylinders can be in mutual ventilation through this hole portion. This hole portion is provided according to the following objects.

A first object is to solve engine pumping loss in the crank case.

Namely, during the piston vertical movement due to combustion in a certain cylinder, for example, in the explosion stroke, a piston is pushed down to the bottom of the cylinder by combustion energy generated by explosion in a combustion chamber. At this moment, air in the cylinder is compressed at the piston back side. In this case, this compressed air attenuates the kinetic energy of the descending piston, and energy transmitted to the crank via a connecting rod may be lost.

On the other hand, in the exhaust stroke, as the piston elevates in the cylinder while sucking air of the rear side of the piston, at the same time, a negative pressure is generated at the rear side of the piston and kinetic energy transmitted to the crank may be reduced.

Power loss caused by such piston movements is generally called "pumping loss" in the crank case, and a hole portion is provided in the respective crank journal support wall portion penetrating in the thickness direction thereof, in order to resolve such pumping loss in the crank case. It is configured such that respective cylinders can ventilate mutually through this hole portion.

Namely, for example, when a descending piston compresses air in the cylinder, power loss caused by the air compression generated at the piston back side can be reduced by discharging compressed air to adjacent other cylinders through the hole portion. Air led into the other adjacent cylinders can attenuate the negative pressure generated at the back side of the elevating piston.

As the result, for the multiple cylinder engine, such relation is created among a plurality of cylinders, allowing, consequently, to reduce generation of pumping loss in the crank case for the engine as a whole.

As another object of providing a hole portion in the crank journal support wall portion 45, it serves to evacuate blow-by gas leaking from piston ring gap to the crank case 41 side in the compression stroke and explosion stroke of the engine. Further, it contributes to reduction of the engine weight.

For these objects, the hole portion is often opened at respective crank journal support wall portion 45 penetrating in thickness direction thereof; however, for the horizontal opposed type engine, its conditions made it difficult to open the hole portion.

In other words, as for the horizontal opposed type engine, a pair of crank cases are opposed to each other and joined to hold the crank journal. The combustion loads in horizontal opposed type engines, therefore, act in mutual opposition along the piston displacement direction.

As a result, stresses due to the combustion load are also generated in mutually opposed portions of the horizontal opposed type engine. Further, these stresses are concentrated in both of the right and left sides of a joint portion of the crank case joined in opposition. As a result, when a ventilation hole portion is provided in the vicinity of the crank journal support hole portion formed in the crank case, the possibility of concentrating stresses generated due to the combustion load in the vicinity of the hole portion and lowering the strength of the engine in the vicinity of the hole portion exists in either of the right or the left crank case where the hole portion is provided.

SUMMARY OF THE INVENTION

Therefore, the invention intends to prevent the problem of deterioration in engine strength by the concentration of the stress due to the combustion loads applied to the hole portion provided in the crank case. At the same time, the invention intends to reduce the pumping loss in the crank case caused by the vertical movement of the piston. Further, the invention intends to reduce the engine weight while discharging blow-by gas smoothly.

To solve the problem mentioned above, the invention provides a crank journal support portion structure disposed in a crank case 12 of a horizontal opposed type engine 10, wherein a hole portion 21 communicating with an adjacent cylinder 11 is opened, at rotation angular positions of a crank journal 17 with small stress generated at a crank journal support wall portion 20 by combustion load transmitted to the crank journal 17 via a connecting rod 15, in the vicinity of the crank journal support hole 19 of the crank journal support wall portion 20 disposed between respective cylinders 11.

Therefore, operation of the invention is as follows.

Namely, the load generated by the combustion in a combustion chamber of the cylinder 11 is transmitted to the crank journal 17 via a piston 14 and the connecting rod 15 and acts as stress on a periphery of the support hole 19 of the crank journal of the crank journal support wall portion 20 of the crank case 12.

For this case, according to the invention, a large stress generated by the combustion load does not act on the area where the hole portion 21 is disposed, because, in the vicinity of the crank journal support hole 19 of the crank journal support wall portion 20, the hole portion 21 communicating with the adjacent cylinder 11 is provided at rotation angular positions of the crank journal 17. Thus, small stress is generated at the crank journal support wall portion 20 by combustion loads transmitted to the crank journal 17 via the connecting rod 15.

"Rotation angular positions of the crank journal with small stress generated at a crank journal support wall portion by combustion load" are areas C and D around the crank journal support hole portion 19. The small stress rotation angular positions are defined by the rotation angle of the crank journal 17 during the period in which the piston 14 moves from a bottom dead center to a top dead center, for example, in the exhaust stroke, in the crank journal support wall portion 20.

During the explosion stroke, the piston 14 moves from the top dead center to the bottom dead center. Because the combustion pressure increases in the state after the top dead center (ATDC), the combustion load attains its maximum in the state before arriving at the bottom dead center. At this moment, a large stress is generated in the area around crank journal support hole 19 defined by the rotation angle of the crank journal 17.

However, when the explosion stroke is completed to transit to the exhaust stroke, the combustion load does not act. Therefore, the stress concentration to the hole portion 21 periphery can be prevented, even when the ventilation hole portion 21 is opened in the area defined by the crank journal 17 rotation angle corresponding to the transition of this piston 14 from bottom dead center to top dead center.

As the result, the present invention permits the avoidance of considerable stress concentration where the hole portion 21 is provided, even when the hole portion 21 communicating with the adjacent cylinder 11 is provided in the vicinity of the crank journal support hole 19 of the crank journal support wall portion 20.

Besides, according to the present invention, the hole portion 21 is provided in the rotation angular range of crank journal 17 corresponding to the displacement of the piston 14 from the bottom dead center to the top dead center in the cylinder 11. The hole portion 21 is therefore within the areas C and D of crank journal support wall 20 on either side of a joint surface portion 18 of crank cases 12. The hole portion 21 is therefore disposed in mutual opposition between the joint surface portion 18 and a rotation angular position of the crank journal 17 as the piston 14 approaches bottom dead center.

As mentioned above, the combustion pressure acting upon the piston becomes maximum after the top dead center (ATDC) in the explosion stroke. In this case, the stress due to the combustion load becomes maximum within an area A of the crank journal support wall portion 20. The stress increase corresponds to the rotation angle of the crank journal 17 as it passes through the joint surface portion 18 of a pair of crank cases 12 of the horizontal opposed type engine 10 and the arrival of the piston 14 at the bottom dead center. During the course of rotation of the crank journal 17 caused by the displacement of the piston 14 from its top dead center to bottom dead center the corresponding stress occurs.

In this case, for the horizontal opposed type engine, since the cylinder 11 and the piston 14 are disposed in mutual opposition, the generated stress becomes maximum also within an area B of the crank journal support wall portion 20. The generated stress becomes maximum, as in area A, due to the corresponding rotation angle of the crank journal 17 as it passes through the joint surface portion 18 of the crank case 12 of the opposite piston 14, which somewhat symmetrically arrives at the bottom dead center of the piston 14.

Therefore, according to the present invention, the hole portion 21 communicating with its adjacent cylinder 11 is provided in the areas C and D between the joint surface portion 18 of the crank cases 12 disposed in mutual opposition and the rotation angular position of the crank journal 17 at the bottom dead center of the piston 14. The hole position 21 is therefore within the rotation angular range of crank journal 17 from bottom dead center to top dead center of the piston 14, in the vicinity of the support hole 19 of the crank journal 17 of the crank journal support wall portion 20. The hole portion 21 is not provided in the areas A and B affected by the maximum stress generated by the combustion load. Consequently, even when the stress due to the combustion load acts, stress concentrating around the hole portions 21, 21 can be reduced effectively.

DETAILED DESCRIPTION OF PREFERRED EMBODIMENTS

Figure 1:
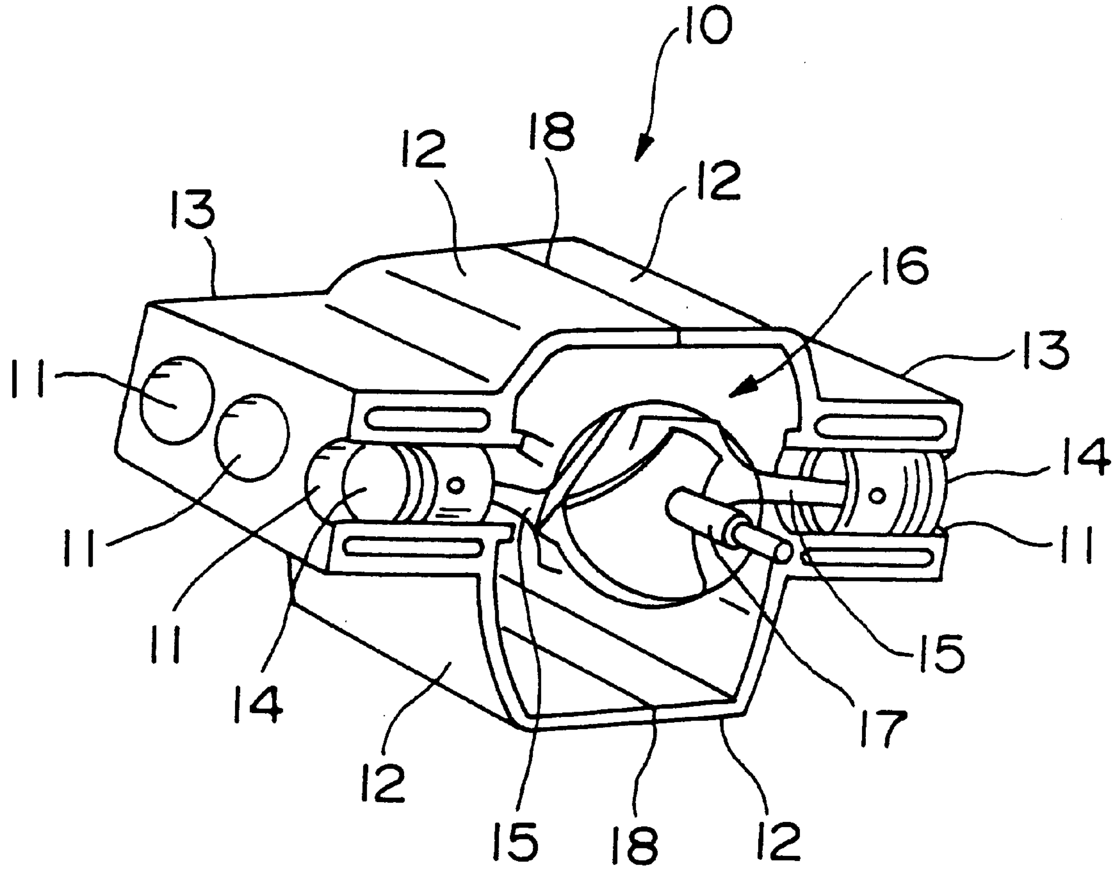
FIG. 1 is a typical view showing generally a horizontal opposed type engine according to the present invention.

As shown in FIG. 1, a crank journal support portion structure disposed in a crank case 12 of a horizontal opposed type engine 10 having a plurality of opposed cylinders, a pair of cylinder blocks 13, 13 joined and disposed in mutual opposition, and pistons 14, 14 disposed in mutual opposition in a plurality of mutually opposed cylinders 11, 11 defined in the respective cylinder blocks 13, 13 compose a multiple cylinder horizontal opposed type engine, or horizontally opposed type 6-cylinder engine, in this embodiment.

Figure 2:
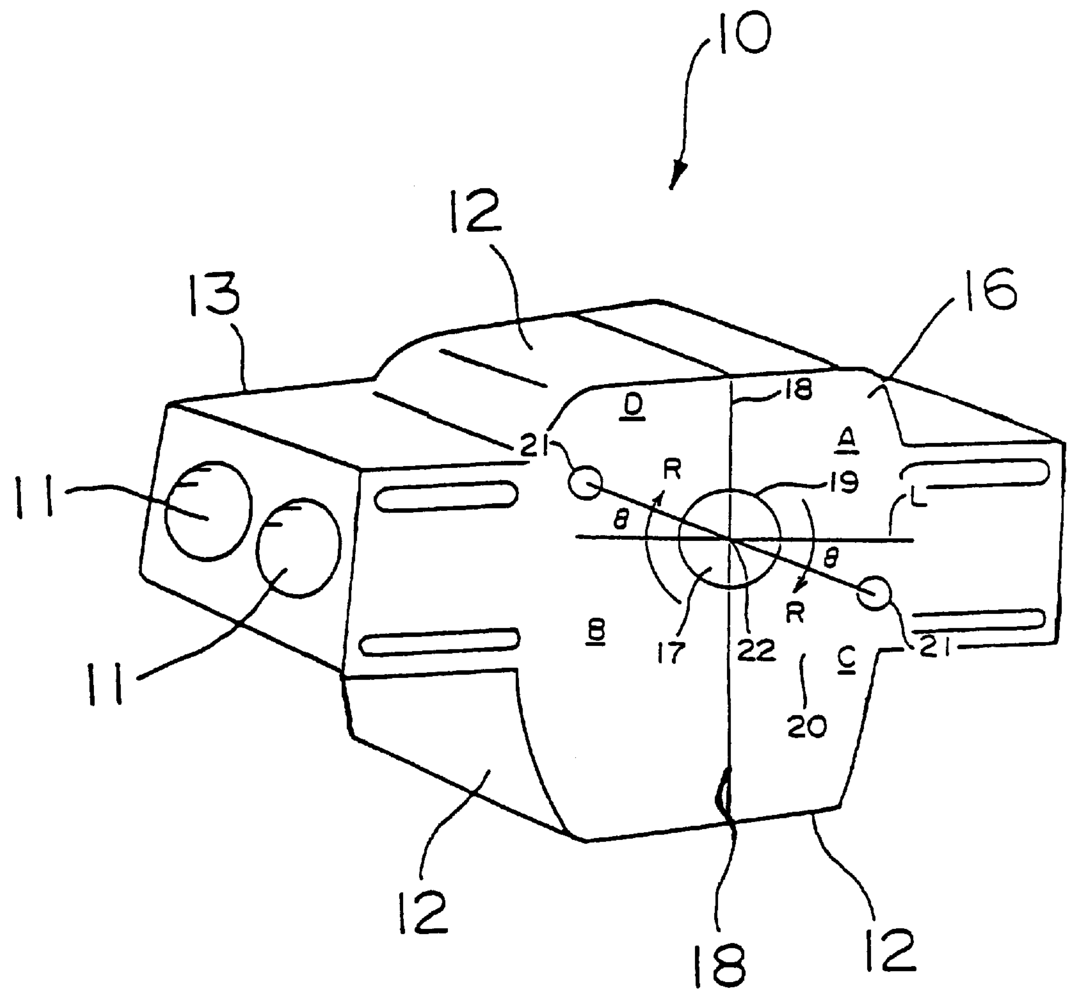
FIG. 2 is a schematic view showing an embodiment of crank journal support portion structure of a horizontal opposed type engine according to the present invention.

As shown in FIG. 1 and FIG. 2, the pair of pistons 14, 14 are respectively connected to a crank shaft 16 via connecting rods 15, 15. A crank journal 17 disposed at the axial center of the crank shaft 16 is supported by a crank journal support hole 19 disposed at a joint surface portion 18 of a pair of crank cases 12, 12 defined in the pair of cylinder blocks 13, 13.

Moreover, in this embodiment, as shown in FIG. 2, a hole portion 21, communicating with its adjacent cylinder 11, is opened between the joint surface portion 18 of the crank cases 12, 12 and the rotation angular position of the crank journal 17 corresponding to the displacement of the piston 14 from the bottom dead center to the top dead center of the piston 14, in the vicinity of the support hole 19 of the crank journal 17 on crank journal support wall portion 20.

As shown in FIG. 2, in this embodiment, the hole portion 21 communicating with its adjacent cylinder 11 is opened in the crank journal support wall portion 20, at the position turned by a predetermined angle θ, in a rotation direction R of the crank journal with respect to an axial line L of the mutually opposed pistons 14, 14. In addition, the same hole portion 21 is opened at a position point symmetrical with respect to the axial center 22 of the crank journal 17 . These hole portions 21, 21 are configured to function as a ventilation hole between mutually adjacent cylinders.

Hole portions 21, 21 are provided in these positions for the following reasons.

Figure 3:
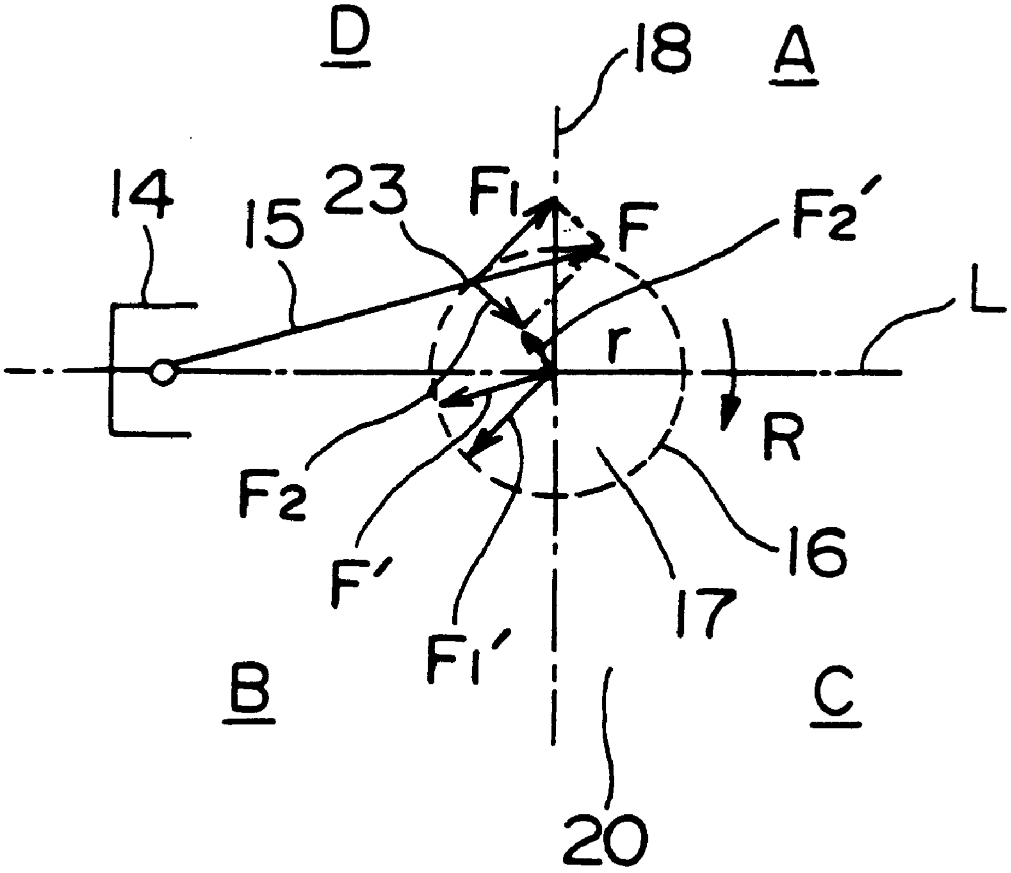
FIG. 3 is also a schematic view showing an embodiment of a crank journal support portion structure of a horizontal opposed type engine according to the present invention, and is a simplified schematic view showing a force acting on a crank pin of a crank shaft via a connecting rod during combustion in the explosion stroke and a reaction force generated in a hole portion supporting a crank journal.
Figure 4:
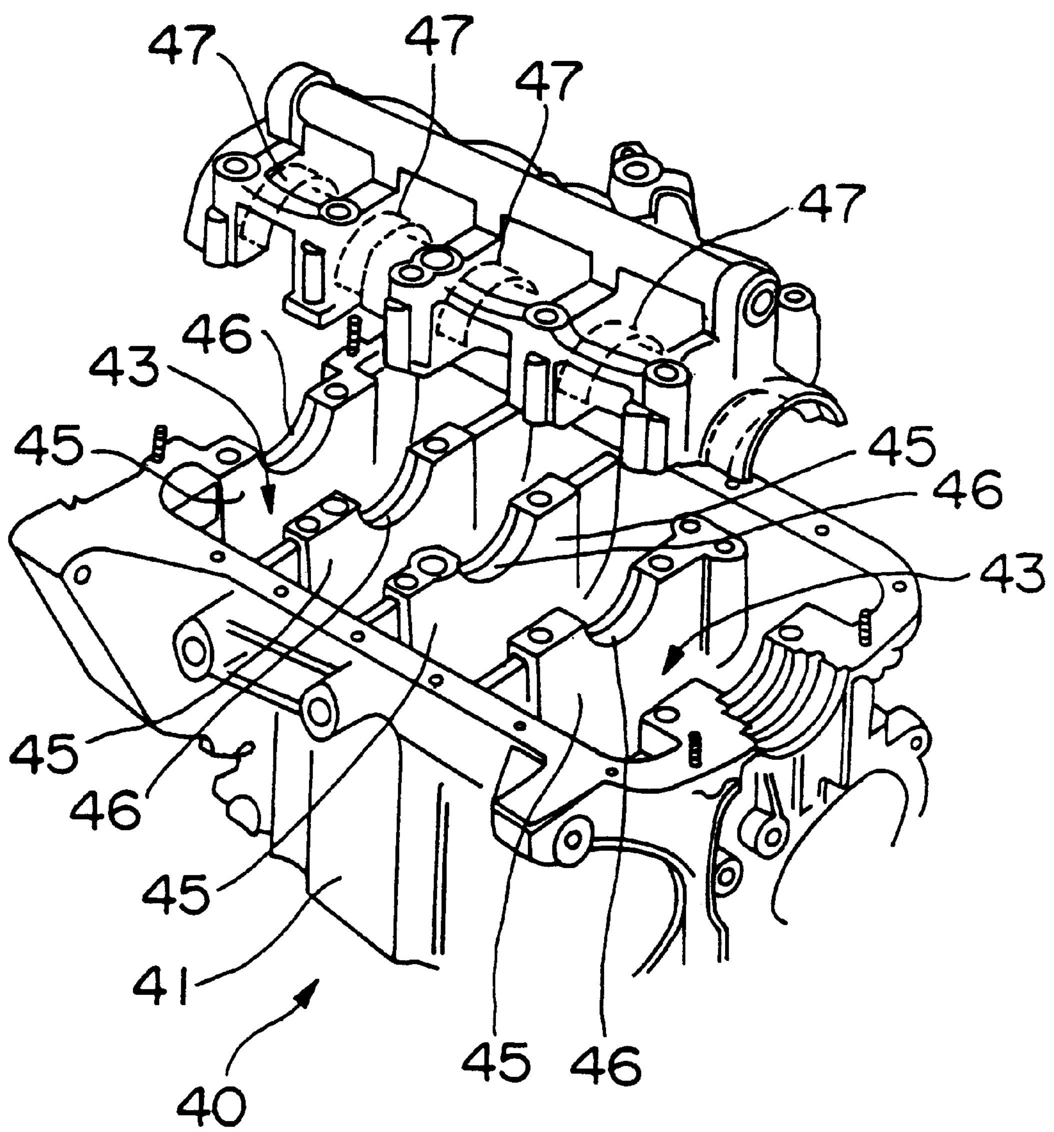
FIG. 4 is an exploded perspective view showing, from engine back side, a crank case portion and a bearing cap portion of a straight type 4-cylinder engine.
Figure 5:
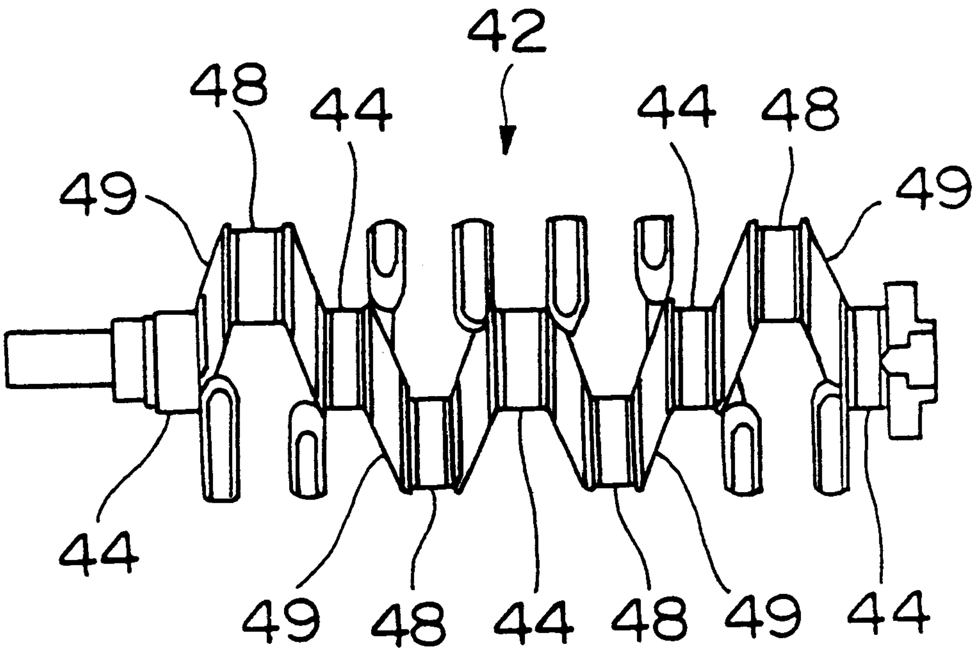
FIG. 5 is a side view showing generally a crank shaft structure.

Namely, FIG. 3 shows typically the relation between the piston 14, the connecting rod 15, a crank pin 23 joining the connecting rod 15 to the crank shaft 16, and the crank journal 17 disposed at the center of the crank shaft 16. As shown in FIG. 3, under the condition where maximum combustion load is acting on the piston 14, in the explosion stroke, the force F acting on the crank pin 23, which is a connection point of the connecting rod 15 axially supported by the piston 14 with the crank shaft 16, can be broken down into a force component F1 to be converted into engine torque, and a force component F2 directed to the axial center of the crank journal 17.

When the reaction force to these force components is analyzed on the axial center of the crank journal 17, it can be broken down into a force component F1' parallel to the force component F1 from the axial center of the crank journal 17 and composed of a vector of the same magnitude in the opposite direction to F1, and a force component F2' in the direction opposite to the force F2 directed to the axial center of the crank journal 17 and composed of a vector of the same magnitude.

In this case, since the F1 and F1' are in couple relation to each other, a torque T ($F1 \times r$) is generated at the crank journal axial center, and this torque T becomes the force to rotate the crank shaft 16 and crank journal 17. As the result, on the axial center of the crank journal 17, it is necessary to maintain the force F', resultant of F1' and F2'.

When the aforementioned analysis is set forth as a premise, as shown in FIG. 1, the load generated by combustion in the cylinder is transmitted to the crank journal 17 of the crank shaft 16 via the piston 14 and the connecting rod 15 axially supported by the piston 14. Moreover, the combustion pressure becomes maximum after the top dead center (ATDC), in the engine explosion stroke.

As shown in FIG. 3, the load F' is a force generated as a reaction force of the load F which is the direction received mainly in an area A, within the area of the crank journal support wall portion 20 shown in FIG. 3.

Consequently, in connection with the rotation angle of the crank journal 17, as shown in FIG. 2 and FIG. 3, the stress due to the combustion load becomes maximum within the area A, from among the section areas A, B, C and D. The sector areas A, B, C and D are designated by dividing into four the crank journal support wall portion 20 according to the crank case joint surface portion 18 and an axial line L defined between the opposed pistons 14, 14 of the crank journal support wall portion 20, as shown in FIGS. 2 and 3. Area A therefore corresponds to the rotation angle of the crank journal 17 in the direction R by passing the crank pin 23 through the joint surface portion 18 of the crank cases 12, 12 to arrive at a position corresponding to the bottom dead center of the piston 14. Such positioning of piston 14 occurs in the course of transition of the piston 14 from the top dead center to the bottom dead center as shown in FIG. 3.

In this case, for the horizontal opposed type engine 10, as a pair of pistons 14, 14 are disposed in mutual opposition, the generated stress also becomes maximum within the area B, similarly as mentioned above, as the rotation of the crank journal 17 passes the crank pin 23 through the joint surface portion 18 of the crank cases 12, 12 to arrive at a position corresponding to the bottom dead center of the mutually opposed piston 14. Again, the positioning of a mutually opposed piston 14 occurs in the course of the mutually opposed piston 14 moving from the top dead center to the bottom dead center, in a manner substantially symmetrical with respect to the axial center 22 of the crank journal 17 and the other piston 14 in area A.

In other words, for the horizontal opposed type engine 10, when the crank shaft 16 rotates clockwise and the explosion load acts on the piston during the explosion stroke, the load acting via the connecting rod is directed to the areas A and B.

As the consequence, when the hole portion 21 is opened as a ventilation hole in the two areas A and B, since the maximum stress generated by combustion load acts on the periphery of the hole portion 21, it is necessary to open the hole portion avoiding the two areas A and B.

In this case, the areas C and D, located between the joint surface portion 18 of the crank cases 12 disposed in mutual opposition and the rotation angular position of the crank journal 17 at the bottom dead center of the piston 14 within the rotation angular range of crank journal 17 corresponding to the displacement of the piston 14 from the bottom dead center to the top dead center of the piston 14 in the cylinder 11 in the crank journal support wall portion 20, are not the areas where the load acts via the connecting rod. Such is true of areas C and D even if the explosion load acts on the piston during the explosion stroke, as described above.

As a result, the areas C and D are the areas where the stress due to the combustion load acting on the crank journal support wall portion 20 will be minimum. Therefore, from the viewpoint of minimizing the concentration of stress due to the combustion load, it becomes necessary to provide the hole portion 21 in these areas C and D.

Now, the operation of the crank journal support portion structure disposed in a crank case of a horizontal opposed type engine according to the invention will be described.

Consequently, as for this embodiment, in a horizontal opposed type engine 10 having 6 cylinders, the load generated by combustion in the cylinder during the explosion stroke is transmitted to the crank journal 17 via the piston 14 and the connecting rod 15. The combustion pressure becomes maximum especially after the piston 14 has achieved the after top dead center (ATDC) position. The ATDC position is achieved in the course of displacement of the piston 14 from the top dead center to the bottom dead center in the explosion stroke. In this case, as for the rotation angle of the crank journal 17, the maximum combustion load acts on the area A of the crank journal support wall portion 20 corresponding to the rotation angle of the crank journal 17 as the crank pin 23 passes through the joint surface portion 18 of the pair of crank cases 12, 12 to arrive at a position corresponding to the bottom dead center of the piston 14.

In this case, for the horizontal opposed type engine, the maximum combustion load acts also on the area B corresponding to the rotation angle of the crank journal 17 as the crank pin 23 for the opposed piston 14 also passes through the joint surface portion 18 of the crank case 12 to arrive at the bottom dead center of the piston 14, which is substantially symmetrical with respect to the crank journal axial center 22 and the other opposed piston 14.

However, in this embodiment, because the hole portion 21 communicating with the adjacent cylinder 11, is opened in the areas C and D between the joint surface portion 18 of the crank cases disposed in mutual opposition and the rotation angular position of the crank journal 17 at the bottom dead center of the piston 14, within the rotation angular range of crank journal 17 from the bottom dead center to the top dead center of the piston 14, in the vicinity of the support hole 19 of the crank journal 17 of crank journal support wall portion 20, concentration of stress around the hole portion 21 will not occur.

In the aforementioned embodiment, although the crank journal support portion of a horizontal opposed type engine according to the invention is described wherein a ventilation hole is provided in the crank journal support portion, the invention is not limited to the aforementioned embodiment. Rather, the invention can be applied to any embodiment where a hole portion receiving explosion load is provided in a support wall portion. In addition, the invention can be applied not only to a horizontally opposed type engine, but also to straight-type or v-type cylinder engines or other cylinder piston engines.

What is claimed is:

1. A crank journal support portion structure, disposed in a horizontal opposed type engine provided with mutually opposed crank cases and a plurality of horizontally opposed adjacent cylinders, each cylinder having a piston, comprising:

a rotatable crank journal; and a crank journal support wall, between adjacent cylinders upon which the crank journal rotates, and which crank journal support wall is substantially perpendicular to a longitudinal axis of the crank journal, the crank journal support wall further being divided into approximately equal quadrants, two diagonally opposed quadrants of the crank journal support wall quadrants having a hole portion passing therethrough, such that each hole portion communicates with adjacent cylinders, wherein each hole portion is so located that during a period from an explosion stroke to an exhaust stroke, and at a rotating angle of the crank journal where the cylinder inner pressure becomes higher than the cylinder inner pressures in other strokes, at diagonally opposed positions, that are other than the quadrants to which the maximum stress by the combustion load is transmitted via the crank journal and the diagonally opposed quadrants where a reaction force of maximum stress is received.

2. A crank journal support structure according to claim 1, wherein each hole portion is provided on the crank journal support wall between a joint surface portion bisecting the mutually opposed crank cases of the horizontal opposed type engine and a rotation angular position of the crank journal corresponding to the displacement of the piston in a cylinder.

* * * * *